United States Patent [19]

Yoshio et al.

[11] 4,232,895

[45] Nov. 11, 1980

[54] IMPACT ABSORBING DEVICE FOR PROTECTING VEHICLE'S OCCUPANT FROM IMPACT CAUSED BY COLLISION

[75] Inventors: Komaki Yoshio, Hadano; Fukuda Shigehisa; Fukuda Tsuguhiro, both of Uenomuro; Nakao Noriaki, Mito; Suzuki Katsuhide; Ishizuka Matsuo, both of Yatabe, all of Japan

[73] Assignee: Japan Automobile Research Institute, Inc., Japan

[21] Appl. No.: 814,615

[22] Filed: Jul. 11, 1977

[51] Int. Cl.² .............................................. B60N 01/02
[52] U.S. Cl. .................................. 296/65 A; 296/35.2
[58] Field of Search ................ 296/65 A, 65 B, 35 A, 296/35 B, 65 R

[56] References Cited

U.S. PATENT DOCUMENTS

| 2,900,036 | 8/1959 | Blake | 296/35 B |
| 3,695,629 | 10/1972 | Schlanger | 296/65 A |
| 3,922,030 | 1/1975 | Stedman | 296/65 A |
| 3,927,730 | 12/1975 | Winslow | 296/35 B |

*Primary Examiner*—John J. Love
*Assistant Examiner*—John A. Carroll
*Attorney, Agent, or Firm*—William A. Drucker

[57] ABSTRACT

In an impact absorbing device for protecting an occupant of a vehicle in the event of a collision, a seat belt for the occupant has an anchor for fixedly mounting on the occupant's seat and adapted to hold the occupant at an optimum angle and in an optimum position. An energy absorbing mechanism is connected between the seat and the floor of the vehicle or a fixture on the floor of the vehicle. The energy absorbing mechanism is constructed to permit a resisted linear movement of the seat, longitudinally of the vehicle, in the event of a collision, so as to absorb the impact forces which would otherwise be applied to the occupant.

6 Claims, 15 Drawing Figures

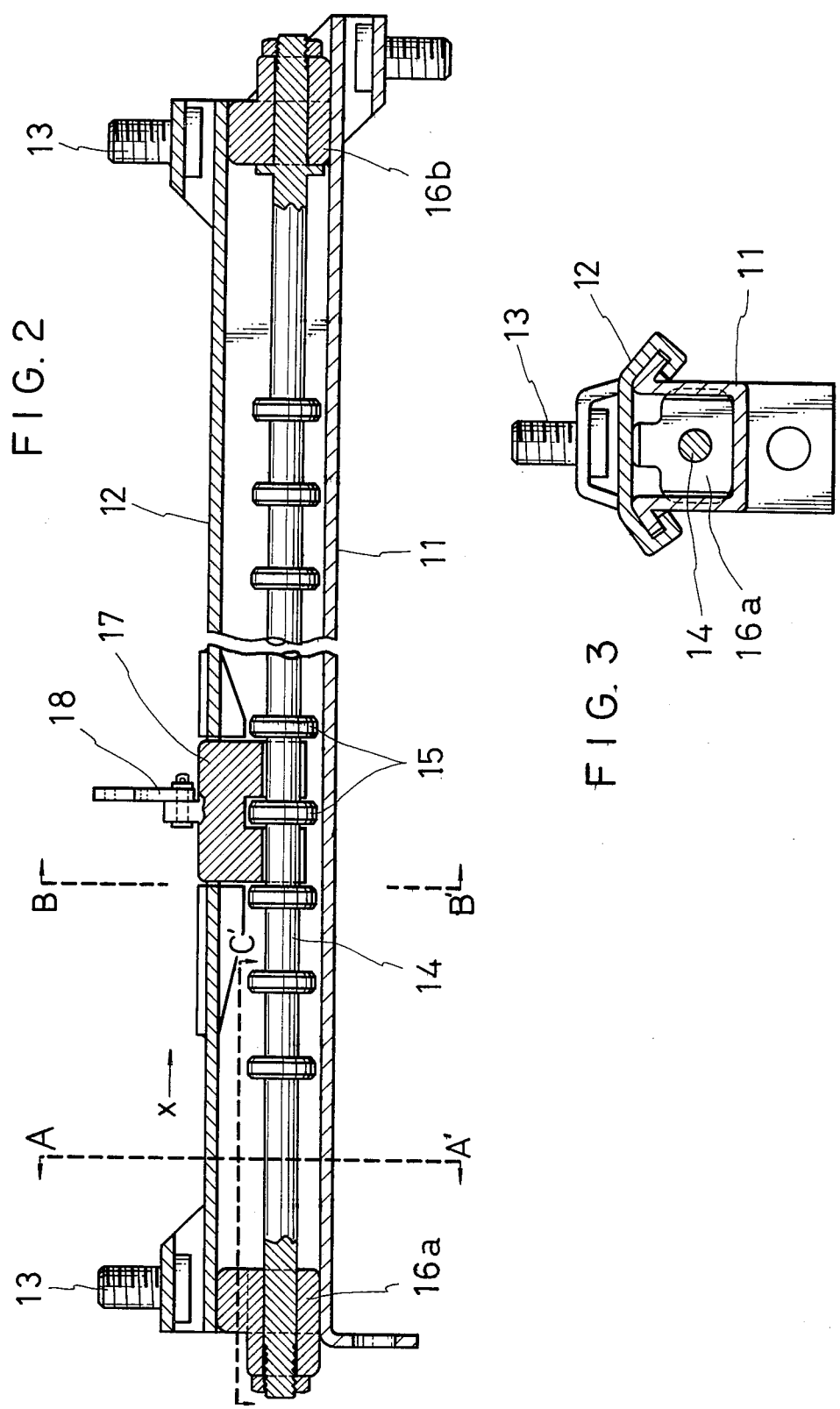

IMPACT ABSORBING DEVICE FOR PROTECTING VEHICLE'S OCCUPANT FROM IMPACT CAUSED BY COLLISION

BACKGROUND OF THE INVENTION

The present invention relates to a device for absorbing and dampening an impact derived from the kinetic energy of a vehicle's occupant held on a seat by a seat belt at the time of a collision.

Conventionally, a vehicle's occupants are protected against the impact, caused by kinetic energy at the time of a collision, by means of a seat belt having an anchor or anchors provided on the floor or a pillar of the vehicle.

This conventional measure, however, cannot provide the optimum posture, i.e. the angle of inclination, nor the optimal position of the occupant, since the seat, is adjusted back and forth in accordance with the size and shape of the occupant.

Recently it has been proposed, in an Advance Notice Concerning Improvement of Seat Belt Assemblies, in order to improve the situation, to make a shoulder portion of the seat belt pass through a guide provided on the seat and to secure the end of the belt to the seat.

However, these proposals impart to the seat belt only a low efficiency of energy-absorption, which is as small as 15%, thus allowing a considerable impact on the occupant.

OBJECT OF THE INVENTION

It is therefore an object of the invention to provide a device for absorbing impact on a vehicle's occupant at the time of a collision so as to minimize the reaction on the occupant, by suitably absorbing the kinetic energy possessed by the occupant.

SUMMARY OF THE INVENTION

According to the invention, there is provided an impact absorbing device capable of normally holding or constraining a vehicle's occupant in an optimum posture and having an energy absorbing mechanism provided between a seat and the floor or a fixture on the floor of the vehicle, or built-in within a seat track adapted to allow a resisted linear movement of the seat back and forth, in case of a collision, thereby to absorb the kinetic energy possessed by the occupant.

THE PRIOR ART

In a known impact absorbing device a fulcrum point is located at the lower end of the fore leg of a seat, so as to cause a forward tilting of the seat together with the occupant, around the fulcrum point, thereby to absorb the kinetic energy by an energy absorbing mechanism associated with the seat.

According to this known arrangement, since the fulcrum point is located at the lower end of the fore leg of the seat, the energy-absorbing stroke becomes smaller for the lower portion of the occupant's body (the under-chest weight of 50% of the average human body being 42 Kg), while a larger stroke is allowed for the upper part of the occupant's body (the above-chest weight of 50% of the average human body being 32 Kg). However, since the impact absorption relies upon the forward tilting movement of the occupant around the fulcrum point located at the lower end of the seat's fore leg, undesirable floating of the occupant's body in the longitudinal direction of the vehicle (about 100 mm as compared with horizontal movement) and a centrifugal force are caused, presenting a risk of secondary collision of the occupant's head against the windshield header panel of the vehicle.

In addition, since the occupant is subjected at first to a downward acceleration by the shoulder belt and then to an upward acceleration due to the rotational movement, the acceleration in the Z direction, i.e. in the direction of a vertical axis, and the resultant acceleration, may become excessively large.

However, according to the invention, since the energy absorption at the time of collision is performed by a resisted linear movement in a back and forth direction, the energy is absorbed at the earlier part of the collision by a translational movement of the occupant's whole body, and by a rotational movement of the upper part of the occupant's body in the latter part of the collision.

It is to be noted that the impact absorbing device of the invention as a whole can absorb as high as 87% of the total kinetic energy of the occupant and the seat.

BRIEF DESCRIPTION OF THE DRAWINGS

The invention will be more fully understood from the following description of the preferred embodiments taken in conjunction with the accompanying drawings in which:

FIGS. 2 to 13 show examples of energy absorbing mechanisms incorporated in the device of the invention in which:

FIG. 2 is a sectional side elevational view of a first example of energy absorbing mechanism in accordance with the invention;

FIG. 3 is a sectional view taken along the line A—A' of FIG. 2;

FIG. 4 is a sectional view taken along the line B—B' of FIG. 3;

FIG. 5 is a sectional view taken along the line C13 C' of FIG. 2;

FIG. 6 is an explanatory illustration of the energy absorbing function;

FIG. 7 is a sectional side elevational view of a second example of the energy absorbing mechanism;

FIG. 8 is a sectional view taken along the line A—A' of FIG. 7;

FIG. 9 is a sectional view taken along the line B—B' of FIG. 7;

FIG. 10 is a sectional view taken along the line C—C' of FIG. 7;

FIG. 11 is an underplan view of a die plate;

FIG. 12 is a plan view of a plastically deformable member;

FIG. 13 is an explanatory illustration of the energy absorbing function;

DESCRIPTION OF THE PREFERRED EMBODIMENTS

Figure 1:
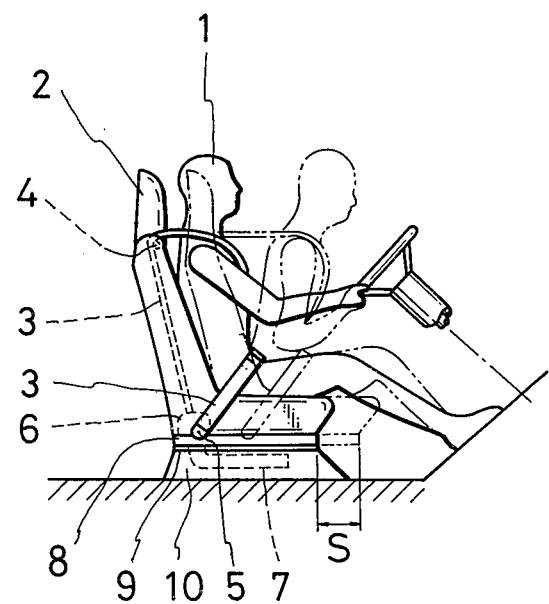
FIG. 1 is a schematical illustration of the impact absorbing device in accordance with the invention.
Figure 4:
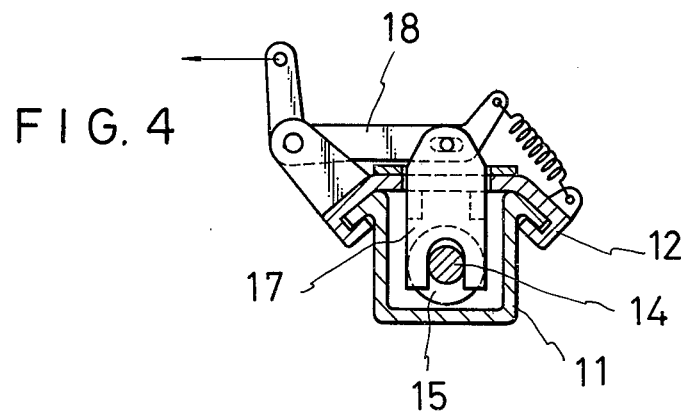
Figure 5:
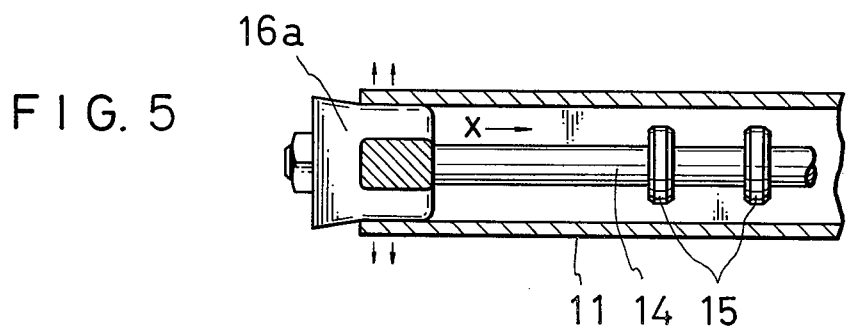
Figure 6:
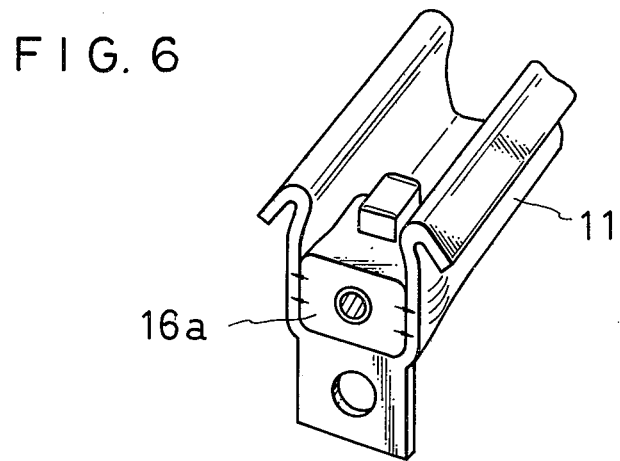
Figure 7:
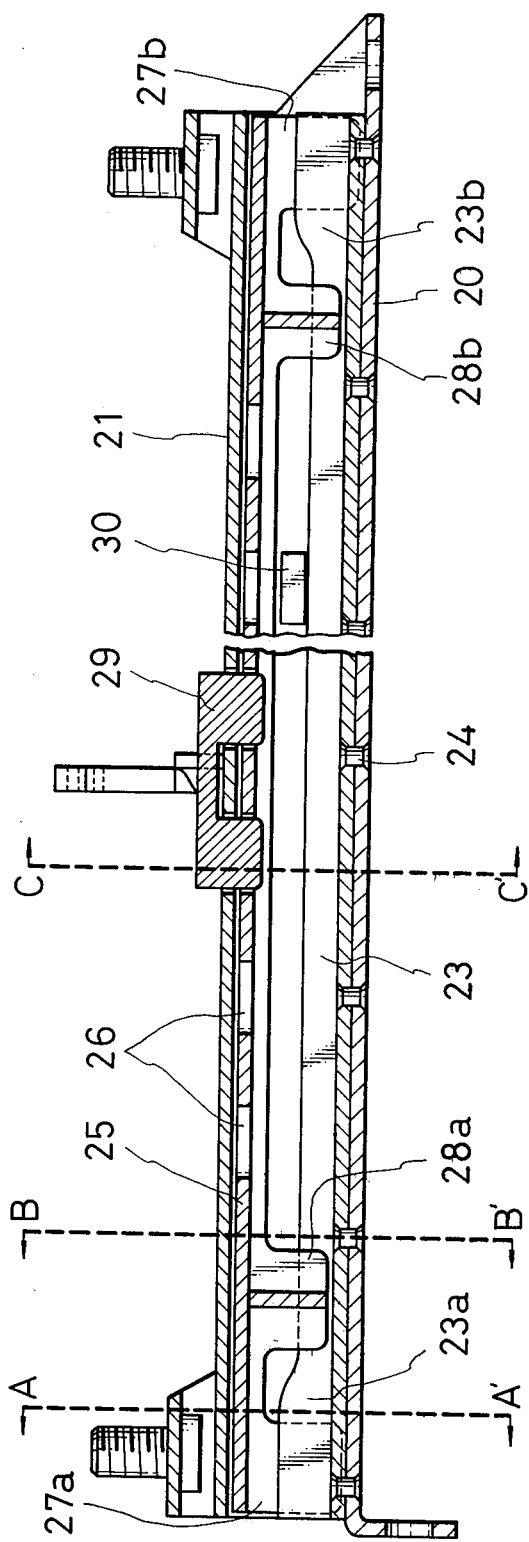
Figure 8:
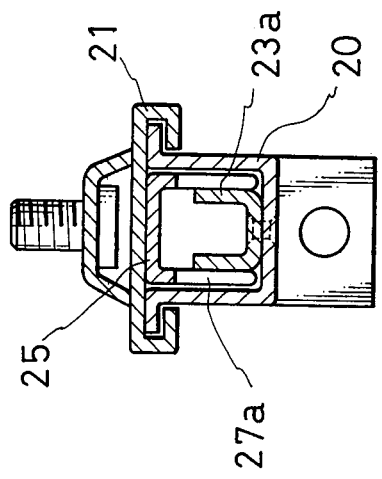
Figure 9:
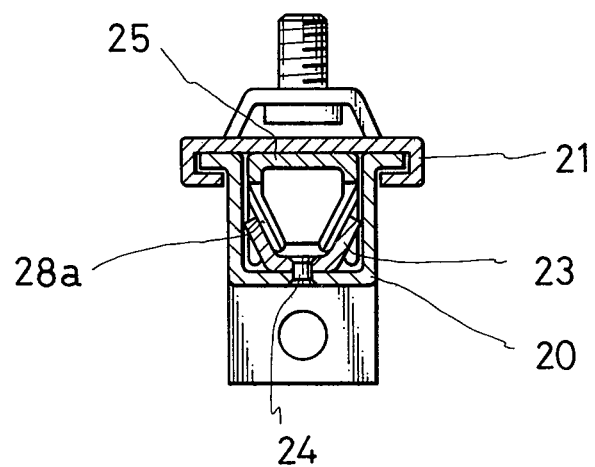
Figure 10:
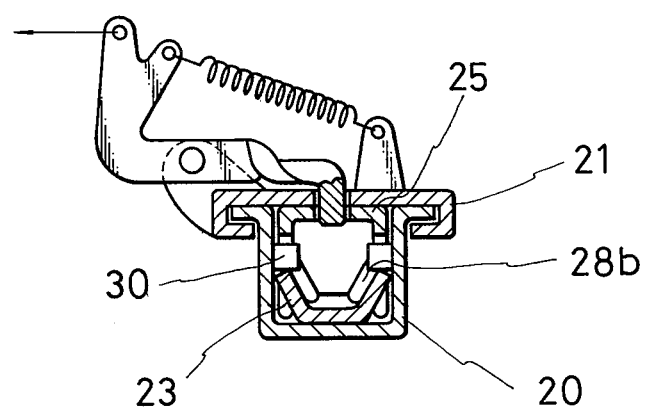
Figure 11:
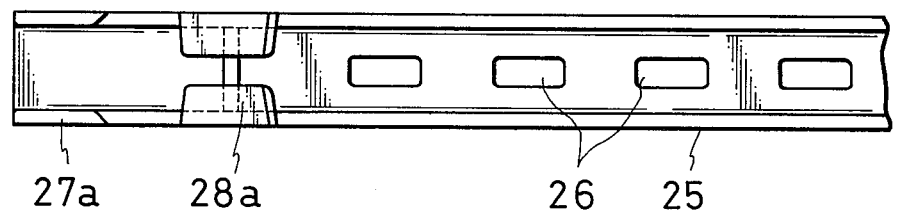
Figure 12:
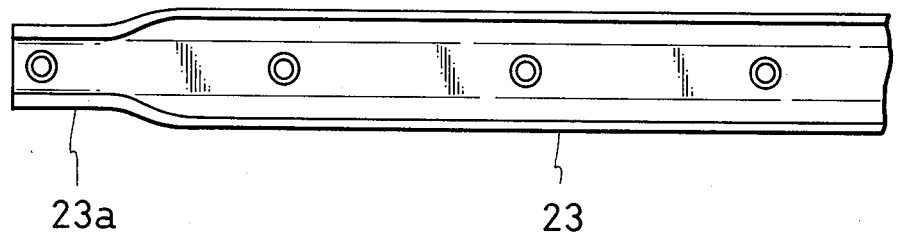

Referring firstly to FIG. 1, an occupant on a seat 2 is designated by numeral 1. The seat 2 is mounted, adjustable back and forth, on a seat track 9 provided on a housing 10 fixed to the floor of the automobile by means of a seat frame 8. According to the invention, an energy absorbing mechanism 7 is interposed between the seat frame 8 and the housing 10, or the floor of the automobile. Alternatively, the seat track 9 may incorporate an energy absorbing mechanism 7.

A three-point or four-point type seat belt 3 is connected to an emergency locking type retracter 6 provided with an energy absorbing mechanism for the shoulder belt, and to an anchor 5 provided on the seat frame 8 for the lap belt, by a turning fixture 4 provided in the seat back of the seat 2.

In the case of a collision of the automobile, the occupant 1 held by the seat belt 3 onto the seat 2 is caused to move linearly as denoted by reference S, along with the seat 2, whilst being decelerated by the energy absorbing mechanism 7, during which most of the kinetic energy possessed by the occupant 1 and the seat 2 is absorbed. In the later part of the period of the collision, the kinetic energy still remaining in the upper part of the occupant's body is absorbed by the emergency lock type retracter 6 which is provided with an energy absorbing mechanism and is installed at the anchor portion of the shoulder belt, so as to hold the occupant 1 safely on the seat 2.

Thus, the impact on the occupant in the case of a collision is conveniently relieved or dampened by the energy absorbing mechanism 7, during a substantially horizontal movement of the seat 2 through an appropriate distance. The device of the invention can therefore minimize the reaction on the occupant's body, ensuring enhanced safety over the conventional safety device consisting solely of a seat belt or known impact absorbing means provided on the seat.

The energy absorbing mechanism 7 of the invention which provides the enhanced or improved effect as described above may be constituted by a hydraulic cylinder. Alternatively, seat adjusters incorporating one of the examples of energy absorbing mechanism as shown in FIGS. 2 to 13 are effective.

Hereinafter, preferred embodiments of the invention will be described with reference to the drawings.

Referring at first to FIGS. 2 to 6 inclusive showing a first embodiment, a lower rail 11 is fixed to the floor of the automobile and slidably carries an upper rail 12. A seat is fixedly attached to the upper rail 12 by means of bolts 13. A rod 14 running through the lower rail 11 longitudinally of the latter has a plurality of flanges arranged at a suitable pitch, for locating the seat. Wedge-shaped dies 16a, 16b are attached to respective ends of the rod 14 and are fitted to the bore of the lower rail 11, so as to secure the rod 14 against axial movement. A locking claw 17 secured to the upper rail 12 is adapted to engage the selected flange 15, so as to fix the seat at a position which is adjustable in the back and forth direction. Numeral 18 denotes a bar for disengaging the claw 17 from the flange 15.

In the normal state of use in which the locking claw 17 is in engagement with one of the flanges 15, the seat, upper rail 12 and the rod 14 constitute an unitary body.

When a collision occurs, the kinetic energy of the seat and the occupants is applied to the bolts 13, so that the rod 14 is displaced in the direction of arrow x. Consequently, the die 16a at one end of the rod 14 slides along, forcing the opposing walls of the lower rail 11 away from each other.

This movement of the die 16a consumes the kinetic energy applied to the bolts 13, due to the plastic deformation of the walls of the lower rail which are deformed to move apart from each other and due to the frictional resistance by which the die 16a is encountered. Needless to say, kinetic energy acting rearwardly of the automobile due to a rear end collision is absorbed in the same manner, by the die 16b at the other end of the rod 14.

FIGS. 7 to 13 show a second embodiment of the invention. The upper and lower rails are denoted by 21 and 20, respectively. A plastically deformable member 23 made of aluminium or like material is fixedly mounted in the lower rail 20, by means of rivets 24. The plastically deformable member 25 has a diverging U-shaped cross-section at its intermediate portion andd regular U-shaped cross-sections at both ends thereof. The end portions 23a, 23b of the regular U-shaped cross-sections are formed by drawing.

A die plate 25 mounted on the plastically deformable member 23 has an upper surface which runs parallel with the upper rail 21. Locking bores 26 are formed in the upper surface of the die plate 25 at a suitable pitch. The die plate 25 has at its respective ends dies 27a, 27b having an inverted U-shaped cross-section adapted to engage the outer surface of the regular U-shaped cross-sections 23a, 23b of the plastically deformable member 23. The die plate 25 further has guide members 28a, 28b located in the vicinity of the dies 27a, 27b, for contacting the inner wall of the plastically deformable member 23. A locking claw 29 is adapted to unitarily connect the upper rail 21 and the die plate 25 to each other for positioning the seat adjustably back and forth. Numeral 30 denotes a stop.

The energy absorbing mechanism of the invention functions as follows.

Figure 13:
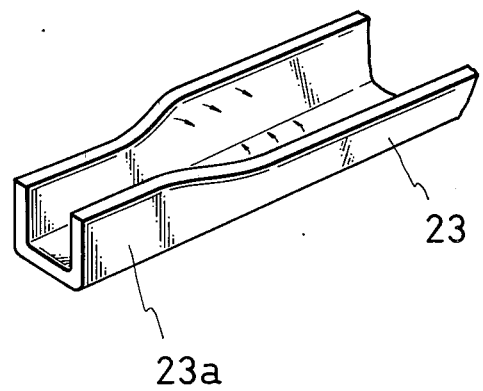

Kinetic energy possessed by the occupant and the seat exerted as a force on the seat-attaching bolts 13 causes an unitary movement of the upper rail 21 and the die plate 25 in either direction. During the movement, one of the dies 27a, 27b slides along, pressing and deforming inwardly the plastically deformable member 23, which has originally a diverging U-shaped cross-section, as shown in FIG. 13. This plastic deformation and the frictional resistance which the die encounters absorbs the kinetic energy. The guide members 28a, 28b serve to guide the die plate 25 correctly along the plastically deformable member 23, while the end of movement of the die plate 25 is limited by abutment of the die 27a, 27b on the stop 30.

The advantageous effect of the invention in protecting the occupant from impact caused by a collision will be more fully understood from the following table which show results of tests conducted by the inventors, employing a dummy and using an impact testing instrument of LAPAN AUTOMOBILE RESEARCH INSTITUTE INC. to which the inventors belong.

TABLE 1

| IMPACT VELOCITY | 30 mph | 40 mph |
|---|---|---|
| HEAD INJURY CRITERION | 261 to 299 | 354 to 440 |
| SEVERITY INDEX OF CHEST | 213 to 238 | 250 to 330 |
| RESULTANT ACCELERATION OF HEAD (g) | 41 to 43 | 39 to 47 |

TABLE 1-continued

| IMPACT VELOCITY | 30 mph | 40 mph |
| --- | --- | --- |
| RESULTANT ACCELERATION OF CHEST (g) | 34 to 37 | 38 to 42 |

The table 1 shows the results of tests at impact velocities of 30 and 40 mph, employing the HYDRID-II dummy.

Figure 14:
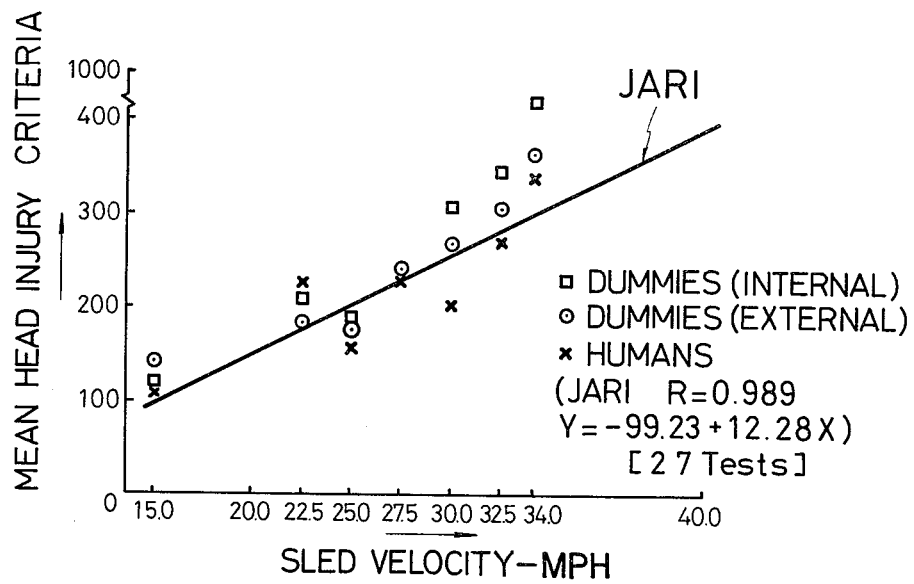
FIG. 14 shows a result on a test conducted with the device of the invention employing a HYBRID-II dummy, plotted in accordance with the result of the test made by General Motors Corp, for comparison of HEAD INJURY CRITERION, and, FIG. 15 is a similar representation to that of FIG. 14, showing the result of the test for comparing the SEVERITY INDEX OF CHEST.
Figure 15:
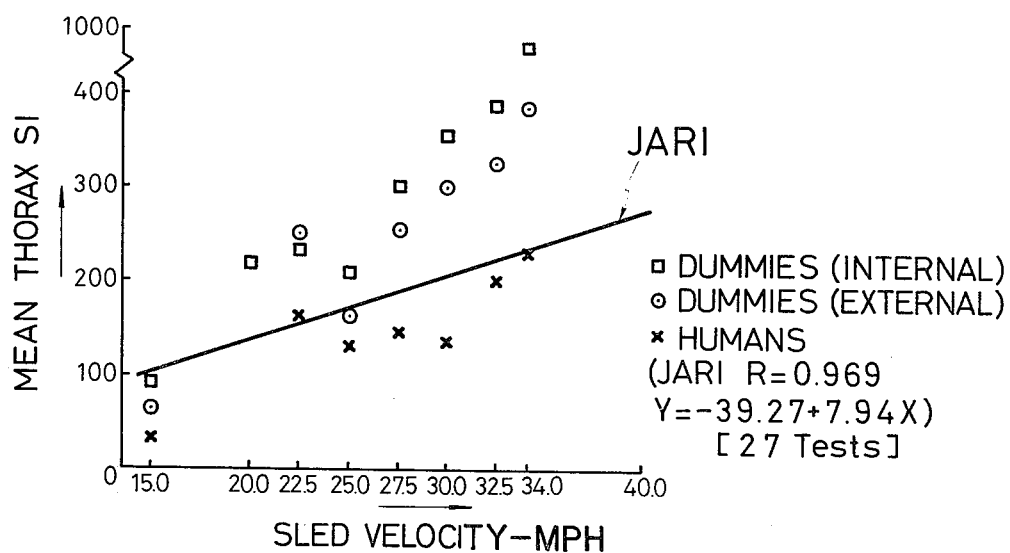

The superiority of the impact absorbing device of the invention will be clear to those skilled in the art from data shown in the table 1 and the attached FIGS. 14 and 15.

We claim:

1. In a vehicle seat structure including a seat mounting having a first portion for securing to the vehicle, and a second portion to which a seat may be secured, said second portion being relatively movable with respect to said first portion along the direction of movement of the vehicle, the improvement which comprises:
   (i) said second portion is engaged with said first portion for said relative movement so as to be guided thereby along the direction of movement
   (ii) a plastically deformable deformation member is secured to one of said first and second seat
   (iii) die means are secured to the other of said first and second seat mounting portions,
   said deformation member and said die means being positioned for engagement one with the other such that, when said second portion moves with respect to said first portion, said die means progressively deforms said deformation member for the absorbtion of kinetic energy resulting from deceleration of the seat structure.

2. A vehicle seat structure, as claimed in claim 1, wherein said deformation member is secured to said first seat mounting portion, and said die means is secured to said second seat mounting portion.

3. A vehicle structure, as claimed in claim 1, wherein said first and second seat mounting portions each include a respective rail extending in said direction of movement, said rails being engaged one with the other for relative sliding movement of said seat mounting portions, one of said rails providing said deformation member.

4. In a vehicle seat structure including a seat mounting having a first portion for securing to the vehicle, and a second portion to which a seat may be secured, said second portion being relatively movable with respect to said first portion along the direction of movement of the vehicle, the improvement which comprises:
   (i) said first and second seat mounting portions each include a respective rail extending in the direction of movement, said rails being engaged one with the other for relative sliding movement of the seat mounting portions guided along the direction of movement,
   (ii) one of said rails provides a plastically deformable deformation member,
   (iii) die means are secured to the other of said rails, said deformation member and said die means being positioned for engagement one with the other such that, when said second portion moves with respect to said first portion, said die means progressively deforms said deformation member for the absorbtion of kinetic energy resulting from deceleration of the seat structure, and
   (iv) means are provided for releasably locating said second seat mounting portion with respect to said first seat mounting portion, said locating means including a rod having at spaced positions thereon a pair of dies positioned for engagement with said deformation member and constituting said die means, and means carried by the other of said seat mounting portions and movable into and out of locking engagement with said rod at selected positions along said rod.

5. In a vehicle seat structure including a seat mounting having a first portion for securing to the vehicle, and a second portion to which a seat may be secured, said second portion being relatively movable with respect to said first portion along the direction of movement of the vehicle, the improvement which comprises:
   p1 (i) said first and second seat mounting portions each include a respective rail extending in the direction of movement, said rails being engaged one with the other for relative sliding movement of the seat mounting portions guided along the direction of movement,
   (ii) a plastically deformable deformation member is secured to one of said first and second seat mounting portions, and
   (iii) die means are secured to the other of said first and second seat mounting portions, said deformation member and said die means being positioned for engagement on with the other such that, when said second portion moves with respect to said first portion, said die means progressively deforms said deformation member for the absorbtion of kinetic energy resulting from deceleration of said seat structure.

6. A vehicle structure, as claimed in claim 5, wherein said deformation member is a channel secured to said one rail, said channel having end zones thereof which are of substantially U-shaped cross-section and a zone intermediate said end zones which has side walls which are laterally expanded in relation to said end zones, said die means being a pair of dies secured at spaced positions to said other rail and being shaped to each closely embrace a respective end zone, such that upon relative movement of said rails, a respective one of said dies moves along and inwardly deforms said side walls of said intermediate zone.

* * * * *